April 2, 1935.  A. MARCHEV  1,996,583
DUPLICATOR
Filed March 29, 1933  5 Sheets-Sheet 1

Inventor:
Alfred Marchev,
By Dyrenforth, Lee, Chritton & Wiles
Attorneys

April 2, 1935.　　　A. MARCHEV　　　1,996,583
DUPLICATOR
Filed March 29, 1933　　　5 Sheets-Sheet 2
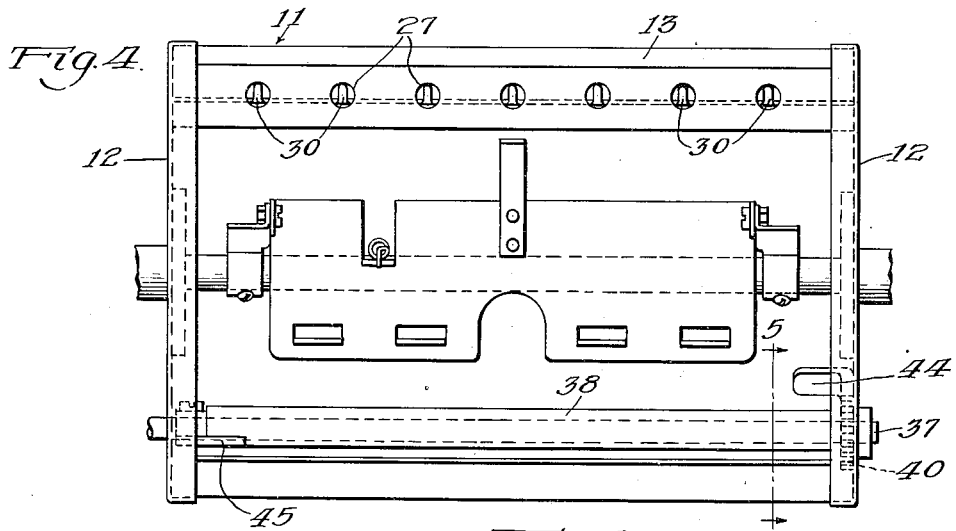
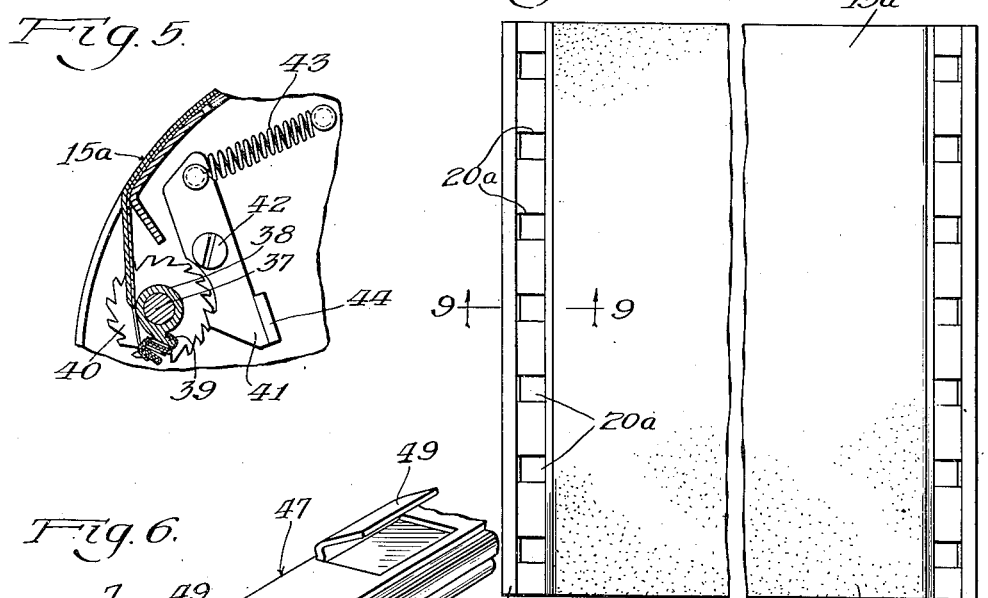
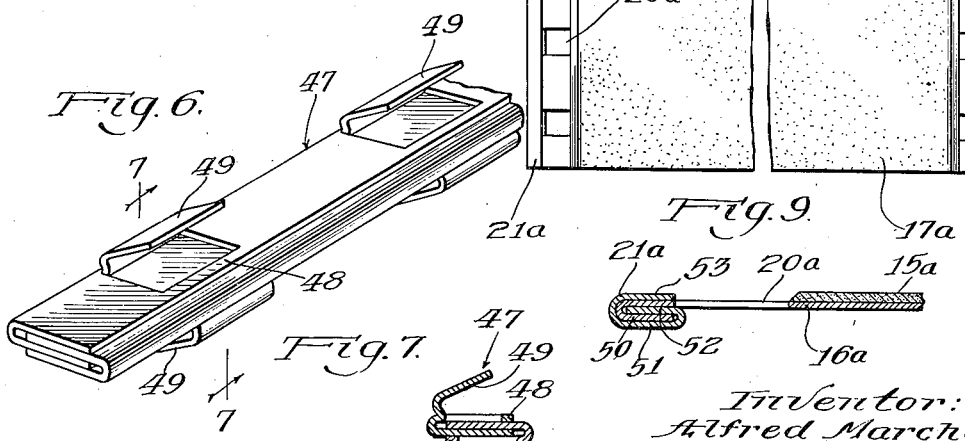

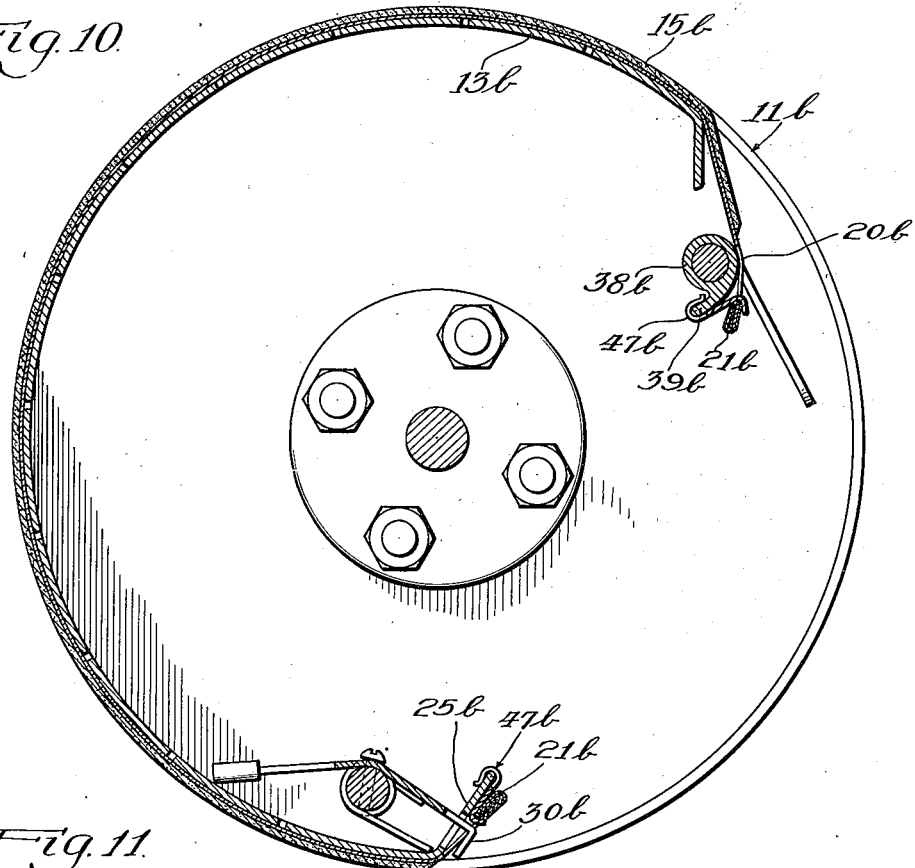
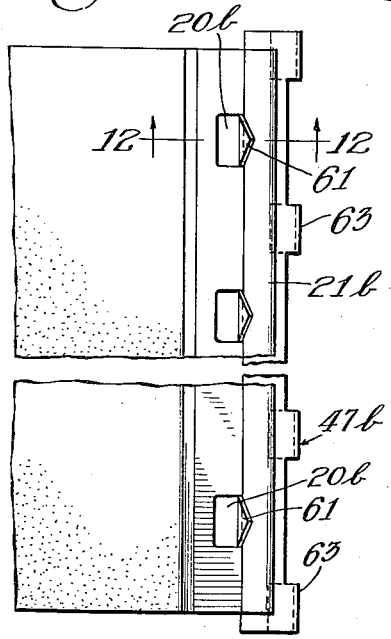
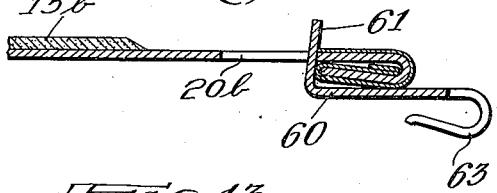
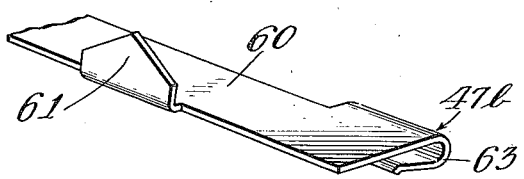

April 2, 1935.                A. MARCHEV                1,996,583
                              DUPLICATOR
                         Filed March 29, 1933        5 Sheets-Sheet 4
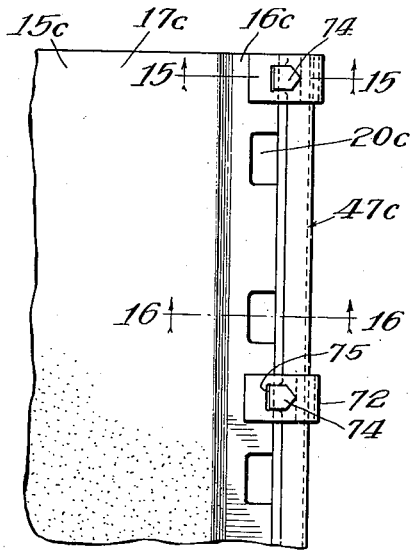
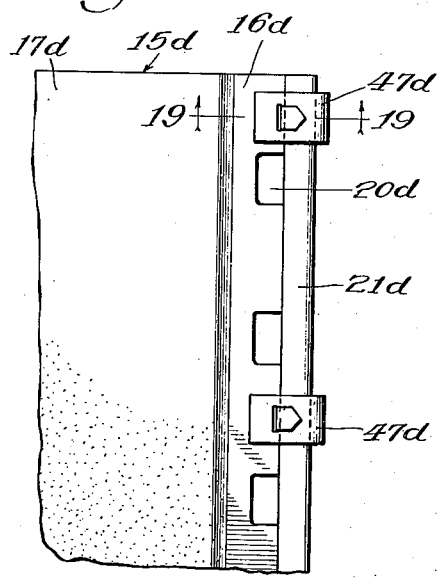
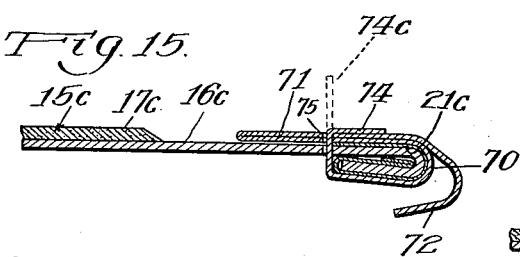
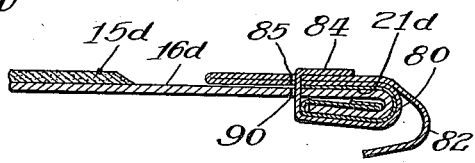
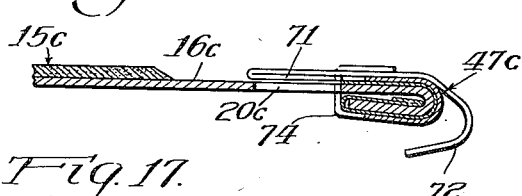
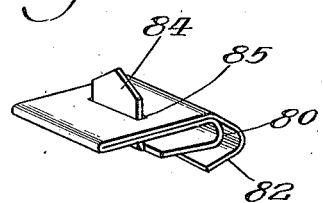
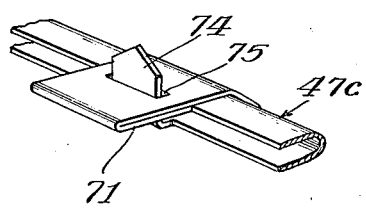
Inventor:
Alfred Marchev,
By Dyrenforth, Lee, Chritton & Wiles,
Attorneys.

April 2, 1935.　　　　A. MARCHEV　　　　1,996,583
DUPLICATOR
Filed March 29, 1933　　　5 Sheets-Sheet 5
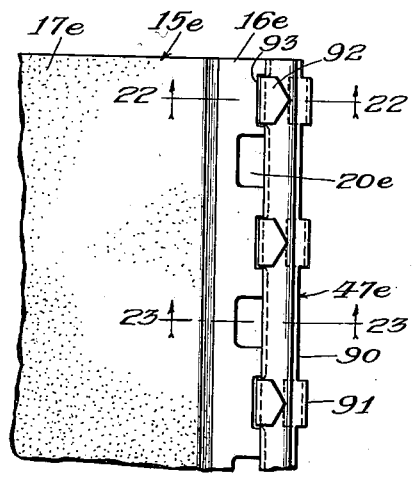
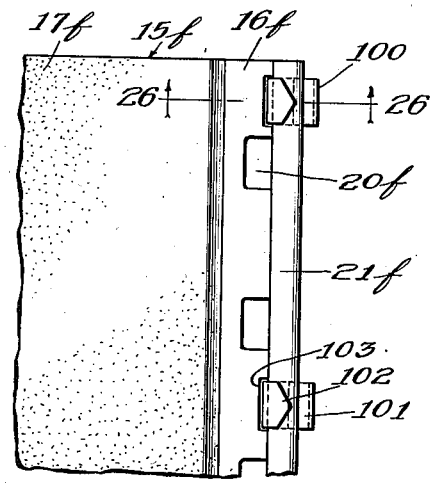
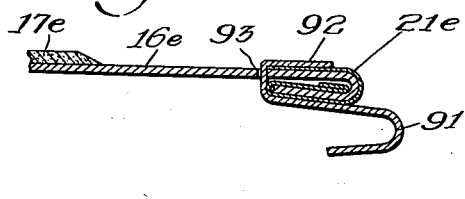
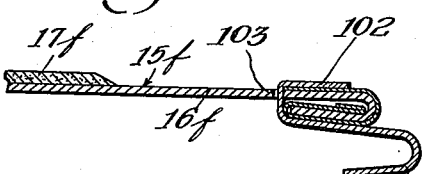
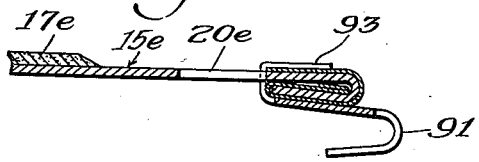
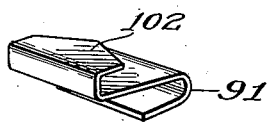
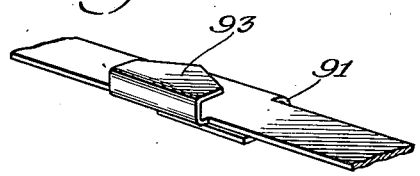
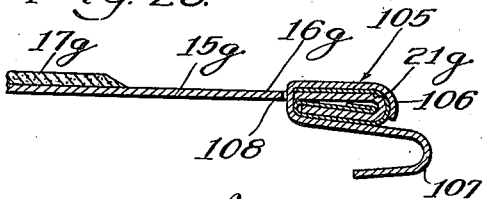

Patented Apr. 2, 1935

1,996,583

UNITED STATES PATENT OFFICE 1,996,583

DUPLICATOR

Alfred Marchev, La Grange, Ill., assignor to Ditto Incorporated, a corporation of West Virginia Application March 29, 1933, Serial No. 663,405

7 Claims. (Cl. 101—132)

The invention relates to duplicators and particularly to duplicating bands and means for securing such bands in duplicating machines.

The invention is particularly adapted to be embodied in hectograph machines of the rotary type but the invention is limited to this use only to the extent indicated in the appended claims.

The invention is disclosed in connection with duplicating bands of the type shown in my co-pending application, Serial Number 599,214 filed March 16, 1932, which bands are adapted for use in duplicators of the type shown in my co-pending application, Serial Number 616,986 filed June 13, 1932.

The invention has, among its other objects, the provision of an improved duplicating band and improved means for securing it to a duplicating machine.

Other objects and advantages will become apparent as the following detailed description progresses, reference being had to the accompanying drawings, wherein—

Fig. 4 is an elevation of a duplicating cylinder or drum which forms part of the duplicating machine shown in Fig. 1.

Fig. 5 is an enlarged section taken on line 5—5 of Fig. 4.

Fig. 6 is a fragmentary perspective view of a clip which forms improved means for securing duplicating bands to the duplicating machine shown in Fig. 1.

Fig. 7 is a section taken on line 7—7 of Fig. 6.

Fig. 8 is a plan view, partly broken away, of another duplicating band which embodies the invention.

Fig. 9 is a section taken on line 9—9 of Fig. 8.

Fig. 10 is a transverse section taken through a duplicating drum of the type shown in Fig. 1, improved means being shown for securing a duplicating band to the drum.

Fig. 11 is a fragmentary plan view of the duplicating band and fastening means shown in Fig. 10.

Fig. 12 is an enlarged section taken on line 12—12 of Fig. 11.

Fig. 13 is a fragmentary perspective view of the improved fastening means shown in Figs. 10, 11 and 12.

Fig. 14 is a fragmentary plan view of a duplicating band provided with improved means for securing it to a duplicating drum or cylinder.

Fig. 15 is an enlarged section taken on line 15—15 of Fig. 14.

Fig. 16 is an enlarged section taken on line 16—16 of Fig. 14.

Fig. 17 is a fragmentary perspective of the improved fastening means shown in Figs. 14, 15 and 16.

Fig. 18 is a fragmentary plan view of a duplicating band provided with improved means for fastening it to a duplicating drum or cylinder.

Fig. 19 is an enlarged section taken on line 19—19 of Fig. 18.

Fig. 20 is a perspective view of one of the improved fastening means shown in Figs. 18 and 19.

Fig. 21 is a fragmentary plan view of a duplicating band which is illustrated in connection with fastening means embodying another form of the invention.

Fig. 22 is an enlarged section taken on line 22—22 of Fig. 21.

Fig. 23 is an enlarged section taken on line 23—23 of Fig. 21.

Fig. 24 is a fragmentary perspective view of the improved fastening means shown in Figs. 21 to 23, inclusive.

Fig. 25 is a fragmentary plan view of a duplicating band which is shown in connection with a plurality of fastening means embodying another form of the invention.

Fig. 26 is an enlarged section taken on line 26—26 of Fig. 25.

Fig. 27 is a perspective view of one of the improved fastening devices shown in Fig. 25, and Fig. 28 is a fragmentary section taken through one end of a duplicating band which is provided with fastening means embodying still another form of the invention.

Figure 1:
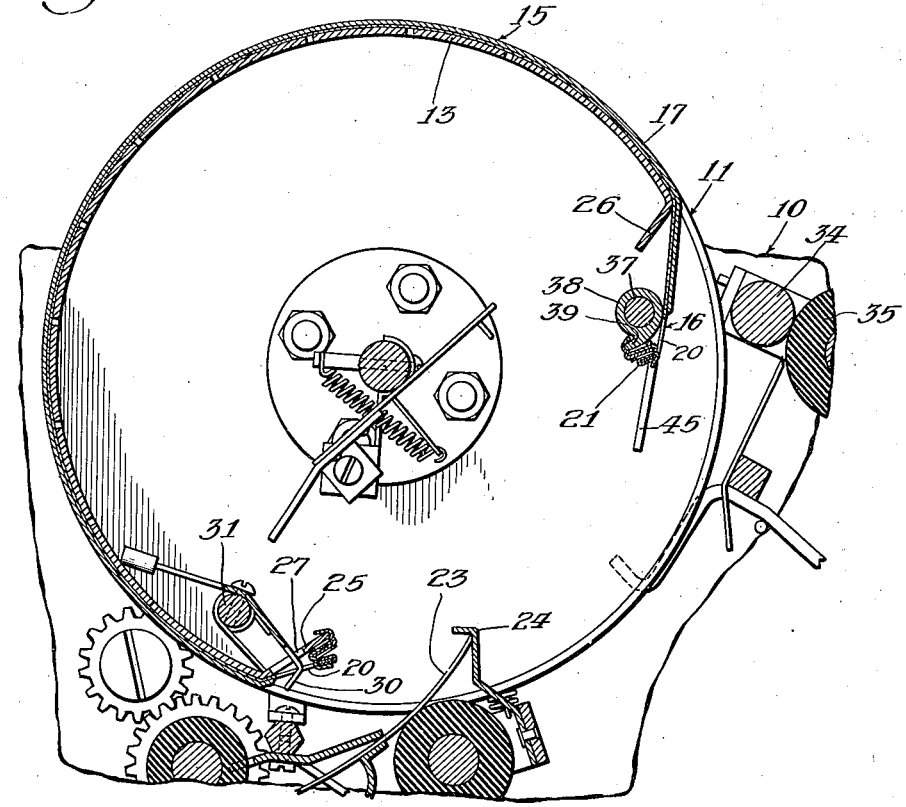
Figure 1 is a fragmentary longitudinal section taken through a duplicating machine and a gelatin band which embodies the invention.
Figure 2:
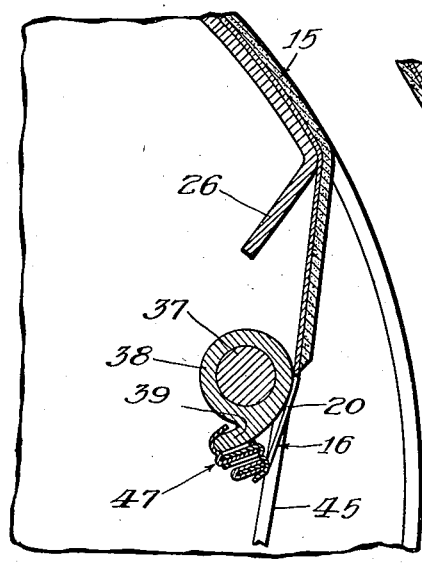
Fig. 2 is an enlarged fragmentary section taken on the same line as Fig. 1.
Figure 3:
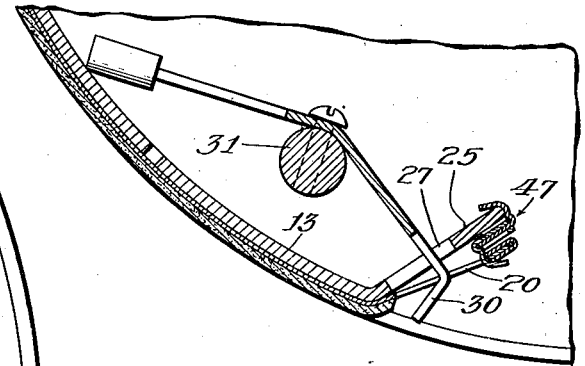
Fig. 3 is an enlarged fragmentary section taken on the same line as Fig. 1.

Referring for the present to Figs. 1 to 7, inclusive, wherein a preferred form of apparatus embodying the invention is shown, the reference character 10 designates generally the frame of a duplicating machine which is preferably identical in construction with the duplicating machine described in my co-pending application, Serial Number 616,986. The machine comprises a duplicating drum or cylinder 11 which is rotatably journaled in the frame 10 and comprises spaced end discs 12 between which an arcuate platen 13 extends (Figs. 1 and 4). The arcuate platen 13 is concentric with the axis of rotation of the cylinder 11.

A duplicating band 15 is trained over the arcuate platen 13 in a manner well known to those skilled in the art. The duplicating band 15 preferably comprises a backing 16 of paper or fabric to which a coating of gelatin 17 has been applied, the gelatin 17 being adapted to receive data from master sheets prepared with suitable inks and being adapted to impart this data to sheets to be duplicated. The gelatin 17 does not extend to the ends of the backing 16 in the preferred embodiments of the invention, the ends of the backing 16 being preferably provided with spaced apertures 20 similar to apertures 20a provided in a duplicating band 15a illustrated in Figs. 8 and 9. The extreme ends of the backing 16 are provided with reenforcing U-shaped strips 21 of sheet metal, these strips 21 being formed on the ends of the backing. It will be noted that the apertures 20 are disposed between the U-shaped strips 21 and the ends of the gelatin 17.

The duplicating machine comprises means (not shown) for feeding sheets to be duplicated to the duplicating cylinder 11. One of these sheets is shown at 23 in Fig. 1 and it will be noted that its forward edge abuts against a margin bar 24 movably mounted in the frame 10, the construction being such that means (not shown) actuated in synchronism with the revolutions of the cylinder 11 withdraw the margin bar 24 to a position outside of the periphery of the cylinder when a sheet 23 has been positioned correctly to be engaged by the gelatin 17 during rotation of the cylinder.

The arcuate platen 13 is preferably formed from sheet metal and comprises inwardly extending integral flanges 25 and 26, the flange 25 being provided with apertures 27 which are alined with the apertures 20 in one end of the duplicating band 15 carried by the arcuate platen. Projecting through the alined apertures 27 and 20 are a plurality of stripping fingers 30 carried by a shaft 31 which is oscillated by means (not shown) actuated in synchronism with the revolutions of the cylinder, the construction being such that the forward edges of the sheets being duplicated are bent outwardly during the rotation of the cylinder so that they will be engaged by rolls 34 and 35 adapted to strip the sheets from the gelatin surface.

Mounted in the discs 12 is a shaft 37 which journals a sleeve 38 provided with a projecting integral flange 39 (Figs. 1, 4 and 5). A ratchet 40 fixed to one end of the sleeve 38 is engageable by a pawl 41 pivoted by a screw 42 to one of the discs 12. The pawl 41 is held yieldingly in engagement with the ratchet 40 by a spring 43. When the pawl 41 engages the ratchet 40, it prevents clockwise rotation (Fig. 5) of the ratchet. The pawl 41 is provided with a finger piece 44 whereby the operator of the machine may displace the pawl to disengage it from the ratchet. When the pawl 41 is engaging the ratchet 40, the ratchet and the sleeve 38 may be displaced angularly in a counter-clockwise (Fig. 5) direction by the operator through the medium of a lever 45 fixed to one end of the sleeve 38.

Associated with the ends of the duplicating band 15 are clips or fastening devices 47 which are preferably identical in construction and are preferably formed from sheet metal. As best shown in Figs. 6 and 7 each of the clips or fastening devices 47 comprises two U-shaped members 48 nested in each other and clamped to each other with sufficient force to secure them to each other permanently. Each U-shaped member 48 has a plurality of lugs or fingers 49 stamped from it, the fingers 49 being placed to correspond to the spacing of the apertures 20 in the duplicating band 15. As illustrated, the clips or fastening devices 47 may be secured detachably to the ends of the duplicating band 15 by inserting the fingers 49 of one U-shaped member 48 through the apertures 20. The fingers 49 of the associated U-shaped member 48 may then be hooked over the flange 25 or the flange 39 (Figs. 1, 2, 3, and 5). After the ends of the duplicating band 15 have been attached to the flanges 25 and 39 in the manner described, the band may be drawn taut over the arcuate platen 13 by displacing the lever 45 to displace the sleeve 38 in a counter-clockwise direction (Fig. 5). The pawl 41 will slip over the teeth of the ratchet 40 during this operation, but so soon as the tightening operation has been completed, the pawl 41 will engage the ratchet 40 and retain the duplicating band in its stretched condition.

The duplicating band illustrated in Figs. 8 and 9 is adapted to be employed in connection with the clips or fastening devices 47 and may be utilized in place of the duplicating band 15. As described above, the duplicating band 15a is provided with apertures 20a at its ends. These apertures 20a lie between a gelatin coating 17a and sheet metal reenforcing strips 21a clamped between two parallel legs 51 and 52 of the reenforcing members 21a, each reenforcing member 21a being provided with a third leg 53 which clamps upon the front or outer side of the backing 16a.

Referring now to Figs. 10 to 13, inclusive, wherein another embodiment of the invention is illustrated, the reference character 11b designates generally a duplicating cylinder or drum which is preferably identical in construction with the drum 11 described above and has the same stripping and tightening mechanisms. The cylinder 11b is interchangeable with the cylinder 11. Associated with the arcuate platen 13b of the cylinder 11b is a duplicating band 15b which is preferably identical in construction with the duplicating band 15 described above so as to provide spaced apertures 20b adjacent the ends of the band through which the stripping fingers 30b project. The ends of the band 15b are provided with reenforcing strips 21b of sheet metal.

The ends of the duplicating band 15b are secured detachably, by clips or fastening devices 47b, to the flange 25b of the platen 13b and to the flange 39b of the sleeve 38b, the sleeve 38b being identical in construction with the sleeve 38 described above and having associated with it means (not shown) identical in construction with the pawl and ratchet mechanism illustrated in Fig. 5.

Each clip or fastening device 49b is preferably formed from sheet metal and preferably comprises a relatively flat strip 60 formed with spaced and pointed integral tongues or fingers 61 which project at an angle to the strip 60, the tongues or fingers 61 being adapted to enter the apertures 20b as illustrated in Figs. 10, 11 and 12. The strip 60 is also provided with spring fingers 63 bent back over the strip 60 and sufficiently resilient so that they may be clamped over the flanges 25b and 39b as illustrated in Fig. 10. The spring fingers 63 will retain the clips or fastening devices 47b on the flanges 25b and 39b even though the operator has not yet drawn the duplicating band 15b taut on the platen member 13b.

Referring now to Figs. 14 to 17, inclusive, wherein another embodiment of the invention is illustrated, the reference character 15c designates a duplicating band which is preferably identical in construction with the duplicating band shown in Figs. 10, 11 and 12 and may be utilized in place of that duplicating band and also in place of the duplicating bands 15 and 15a described above. The duplicating band 15c is provided with clips or fastening devices 47c at its ends, only one end of the duplicating band being shown in the drawings. The duplicating band 15c comprises a backing 16c of paper or fabric to which a layer of gelatin 17c has been applied, the ends of the gelatin coating 17c are spaced from the ends of the backing 16c and the ends of the backing 16c are reenforced by sheet metal reenforcing strips 21c. Intermediate the reenforcing strips 21c and the ends of the gelatin coating 17c, the backing 16c is provided with spaced apertures 20c having the same functions as the apertures 20 in the duplicating band 15 described above. Fastening devices 47c have the same function as the clips or fastening devices 47 described above and may be utilized to detachably secure the duplicating band 15c on the arcuate platen 13 of Fig. 1, the clips or fastening devices 47c being engageable with the flanges 25 and 39 of Fig. 1.

Each of the fastening devices 47c is preferably formed from sheet metal and comprises a U-shaped strip 70 adapted to nest one of the reenforcing strips 21c as best illustrated in Figs. 15 and 16. Projecting from one of the legs of the U-shaped strip 70 and formed integral therewith are a plurality of spaced elongated tabs 71 which overlie the upper face of the backing 16c and are bent back on themselves to provide hook portions 72 engageable with the flanges 25 and 39 of Fig. 1. The strip 70 is also provided with integral pointed tongues 74 adapted to pass through apertures 75 formed in the tabs 71, the construction being such that when the clips or fastening devices 47c are to be assembled with a duplicating band 17c, the ends of the tongues 74 extend as indicated by dotted lines at 74c in Fig. 15 and may be passed through the backing 16c and thence through the apertures 75 whereupon they may be bent over as shown in full lines in Figs. 14, 15 and 16 to secure the clip or fastening device 47c to the duplicating band. Fig. 17 also illustrates the manner in which the tongues 74 are inserted through the apertures 75. It will be noted that the fastening devices 47c are not secured to the duplicating band 17c by tongues or fingers engaging the apertures 20c. After the clips or fastening devices 47c have been secured to the ends of the duplicating bands 17c it may be secured to the platen 13 of Fig. 1 in the same manner as the duplicating band 15.

Referring now to Figs. 18 to 20, inclusive, wherein another embodiment of the invention is illustrated, the reference character 15d designates generally a duplicating band which may be utilized in place of the duplicating band 15c in connection with the duplicating mechanism illustrated in Fig. 1. The duplicating band 15d comprises a backing 16d provided with a gelatin coating 17d. The backing 16d is provided with apertures 20d through which the stripping fingers 30 of Fig. 1 may project. Attached to the ends of duplicating band 15d are clips or fastening devices 47d, a plurality of fastening devices 47d being provided at each end of the duplicating band. The fastening devices 47d are mounted on reenforcing strips 21d clamped to the ends of the backing 16d.

Each fastening device 47d is preferably formed from sheet metal and comprises a strip thereof bent to provide a U-shaped portion 80 adapted to nest a portion of the reenforcing strip 21d. One leg of the U-shaped portion 80 is longer than the other and is bent back upon itself to provide hook portions 82 having the same functions as the hook portions 72 described above. The other leg of the U-shaped portion 80 is provided with an integral tongue 84 which may be passed through apertures 85 formed in the longer leg of the U-shaped portion 80 and bent over as illustrated in Figs. 18 and 19 to secure the fastening device 47d more or less permanently to the duplicating band. It will be readily understood, however, that the fastening devices 47d may be transferred from one gelatin band to another if it is so desired.

Referring now to Figs. 21 to 24, inclusive, the reference character 15e designates generally a duplicating band comprising a backing 16e which has a gelatin coating 17e. The ends of the gelatin coating 17e are spaced from the ends of the backing 16e, the ends of the backing 16e being reenforced by folded metallic strips 21e. The backing 16e is provided with apertures 20e having the same function as the apertures 20 of the duplicating band 15 described above. Only one end of the duplicating band 17e is illustrated but both ends are preferably of identical construction and are provided with like fastening means which is designated generally by the reference character 47e. Each fastening means 47e comprises a flat strip 90 of sheet metal from which a plurality of integral hooks 91 project, the hooks 91 being adapted to engage the flanges 25 and 39 of Fig. 1. Formed integral with the strip 90 are a plurality of pointed tabs 92 which project through apertures 93 in the backing 16e and are folded over as best illustrated in Figs. 22, 23 and 24 to clamp the associated reenforcing strip 21e between them and the main portion of the strip 90. The fastening devices 47e may be removed from the duplicating band 15e for use on another duplicating band but the preferred practice will be to provide new fastening devices 47e for each duplicating band.

Figs. 25 to 27, inclusive, illustrate another form of the invention. A duplicating band 15f comprises a backing 16f which is provided with a gelatin coating 17f. The ends of the coating 17f are spaced from the ends of the backing 16f and the ends of the backing 16f are provided with apertures 20f having the same function as apertures 20 provided in the duplicating band 15 described above. Each end of the backing member 16f is provided with a folded reenforcing strip 21f of sheet metal. Associated with each reenforcing strip 21f are a plurality of spaced fastening devices 100. Each fastening device 100 is substantially S-shaped to provide hook-portions 101 and 102, the hook portions 101 being adapted to engage the flanges 25 and 39 of the machine shown in Fig. 1. The hook portions 102 project through apertures 103 in the backing 16f and are clamped upon the folded reenforcing strips 21f.

Fig. 28 illustrates still another form of the invention. A duplicating band 15f comprises a backing 16g having a gelatin coating 17g. The illustrated end of the backing 16g is reenforced by a folded metal reenforcing strip 21g. Clamped to the reenforcing strip 21g is a fastening device 105 which is preferably substantially S-shaped to provide hook portions 106 and 107, the hook portion 107 being adapted to engage the flanges 25 and 39 of the machine shown in Fig. 1. It will be noted that the hook portion 106 projects through an aperture 108 in the backing 16g and that it is of sufficient length to permit it to be turned over upon the reenforcing strip 21g so that the fastening device 105 is clamped firmly to the reenforcing strip.

While I have shown and described certain embodiments of my invention, it is to be understood that it is capable of many modifications. Changes, therefore in the construction and arrangement may be made without departing from the spirit and scope of the invention as disclosed in the appended claims, in which it is my intention to claim all novelty inherent in my invention as broadly as possible, in view of the prior art.

I claim:

1. The combination with a duplicating band, of a fastening device comprising two nested U-shaped strips of metal, one of said strips having members projecting through said band and the other of said strips having hook portions for detachably securing said band on a platen.

2. The combination with a duplicating band comprising a backing member formed from fibrous material, one end of said backing member being bent over to form a U-shaped portion extending transversely of the backing member, of a sheet metal reenforcing member formed on said U-shaped portion, and a fastening device attached to said reenforcing member and provided with a hook for securing said band to a platen member.

3. The combination with a duplicating band comprising a backing member formed from fibrous material, one end of said backing member being bent over to form a U-shaped portion extending transversely of the backing member, of a sheet metal reenforcing member formed on said U-shaped portion, and a fastening device detachably attached to said reenforcing member and provided with a hook for securing said band to a platen member.

4. The combination with a duplicating band comprising a backing member formed from fibrous material, one end of said backing member being bent over to provide a U-shaped portion extending transversely of said backing member, of a metallic reenforcing member formed on said U-shaped portion, and a fastening device having a hook detachably engageable with said reenforcing member and having another hook for detachably securing said band on a platen.

5. The combination with a duplicating band comprising a backing member formed from fibrous material, one end of said backing member being bent over to provide a U-shaped portion extending transversely of said backing member, of a metallic reenforcing member formed on said U-shaped portion, and a fastening device having a hook detachably engageable with said reenforcing member and having another hook for detachably securing said band on a platen, the first-mentioned hook projecting through said backing member.

6. The combination with a duplicating band comprising a backing member formed from fibrous material, one end of said backing member being bent over to provide a U-shaped portion extending transversely of said backing member, of a metallic reenforcing member formed on said U-shaped portion, and a fastening device comprising a strip of metal bent around said reenforcing member and having a tongue projecting through an aperture formed in said strip, said strip also having a hook for securing said band to a platen member.

7. The combination with a duplicating band comprising a backing member formed from fibrous material, one end of said backing member being bent over to form a U-shaped portion extending transversely of the backing member, of a sheet metal reenforcing member on said U-shaped portion, and a fastening device associated with said reenforcing member and provided with a portion projecting through said backing member, said fastening device having means for securing said band to a platen member.

ALFRED MARCHEV.